United States Patent

[11] 3,615,271

| [72] | Inventor | John W. Dietz<br>Wilmington, Del. |
| [21] | Appl. No. | 6,541 |
| [22] | Filed | Jan. 28, 1970 |
| [45] | Patented | Oct. 26, 1971 |
| [73] | Assignee | E.I. du Pont de Nemours and Company<br>Wilmington, Del. |

[54] PREPARATION OF TITANIUM CARBONITRIDE
3 Claims, No Drawings

[52] U.S. Cl.................................................. 23/359,
 23/191, 260/429.5
[51] Int. Cl.......................................................... C01b 21/06
[50] Field of Search............................................23/359, 191

[56] References Cited
UNITED STATES PATENTS
2,413,778  1/1947  Olson ........................... 23/191
3,032,397  5/1962  Niederhauser ............... 23/191

OTHER REFERENCES
Mellor, J. W., Inorganic and Theoretical Chemistry, Vol. VIII, Supplement I (Nitrogen Part 1); J. Wiley & Sons, Inc., N.Y.

*Primary Examiner*—Oscar R. Vertiz
*Assistant Examiner*—G. Alvaro
*Attorney*—Don M. Kerr ABSTRACT: A process for the production of finely divided titanium carbonitride is disclosed. Titanium tetrachloride is reacted with methylamine in an inert atmosphere to form a titanium chloride amine complex. The complex is then heated in an atmosphere of ammonia or methylamine to about 600° C. over a period of several hours. The atmosphere is then changed to hydrogen or a mixture of hydrogen with argon, methane and/or ammonia, and the temperature is increased to 900° C. Finally, the atmosphere is changed to argon and the temperature is increased to 1,200° C. A high surface area carbonitride product is recovered upon cooling.

PREPARATION OF TITANIUM CARBONITRIDE

PRIOR ART

Various methods are known for the preparation of titanium carbide and titanium nitride. One such method is that disclosed in British Pat. No. 1,069,748 wherein a plasma jet operating at temperatures of at least several thousand degrees centigrade is used to make titanium carbide from titanium tetrachloride and methane. A process for producing titanium carbonitride by reacting titanium dioxide and carbon at or about 1,350° C. in ammonia is described by G. A. Meerson and E. M. Rokitskaya, Izvestia Akademii Nauk SSR, Neorganicheskie Materialy, Vol. 1, No. 1, pp. 80–87, 1965. Generally, the carbonitrides prepared by this process at the lower temperatures are not homogeneous and subsequent heating in excess of 1,800° C. is often needed to obtain a uniform product. The higher temperatures produce undesirable increase in particle size and loss of surface area.

SUMMARY OF INVENTION

According to this invention, it has been found that titanium carbonitride can be prepared at lower temperatures while still giving a good homogeneous product which is finely divided and has a high surface area.

The invention is a process for the preparation of finely divided titanium carbonitride which comprises (a) reacting in an inert atmosphere titanium tetrachloride and a stoichiometric excess of monomethylamine, dimethylamine, trimethylamine or mixtures thereof at a temperature less than the boiling point of titanium tetrachloride, said reaction being completed upon a decrease in the exothermic heat of reaction, (b) heating the reaction product to about 600° C. in an atmosphere of ammonia or said methylamines, (c) increasing the temperature to about 900° C. in an atmosphere of hydrogen or a mixture of hydrogen with at least one member of the group consisting of argon, methane, and ammonia, and (d) increasing the temperature to about 1,200° C. in an atmosphere essentially of argon.

DETAILED DESCRIPTION

An excess of mono-, di-, or trimethylamine or mixtures thereof is fed into liquid $TiCl_4$ until heat generation ceases. This step may be done conveniently anywhere from below room temperature up to the boiling point of $TiCl_4$ (136° C.), but generally it is preferred to hold the reaction temperature in the range of 0–100° C. This first step may also be done by using a spray column where liquid $TiCl_4$ is atomized and then mixed and reacted with the gaseous amine. The preferred temperature range again is from 0° C. to 100° C.

The time of reaction is not critical. When using the spray column, the reaction is instantaneous and the only restriction is that the reactants cannot be fed into the column too fast, otherwise the exothermic reaction will cause the temperature to rise above the desired range because the capacity to remove heat has been exceeded. Likewise, when liquid $TiCl_4$ is used, the rate of amine addition and hence the time is governed by how rapidly heat can be conducted away from the system in order to keep within the desired temperature range. An excess of the amine is always used, and when heat generation ceases, the reaction is complete. The reaction product is a solid titanium chloride amine complex, which precipitates out during the reaction.

This product must be kept in a nonoxidizing atmosphere and is usually further processed without isolation. The product is heated in stages up to 1,200° C. to convert the amine complex to titanium carbonitride. From the initial reaction temperature up to about 600° C., an atmosphere containing $NH_3$ or the gaseous methylamine (mono-, di- and/or tri-) is maintained over the solid reaction product in order to prevent the complex from dissociating. Above about 600° C. the atmosphere over the reaction product is changed to a hydrogen atmosphere optionally containing methane, ammonia, and/or argon in order that the complex can be heated to higher temperatures and be decomposed to titanium carbonitride.

The most surprising feature of this invention is that when the titanium chloride amine complexes are heated above 600° C. they decompose not to the expected nitride of titanium but rather to the carbonitride of titanium, the carbon being supplied by the selected methyl amine. As might be expected, however, titanium nitride may be produced as a secondary product.

Methane may be added to the hydrogen atmosphere used at temperatures between 600° C. and 900° C. in order to help provide carbon. High partial pressures of methane result in excessive carburization and should be avoided. Thus the atmosphere above the reaction product should contain no more than 10 mole percent methane in hydrogen at 600° C. and no more than 2 mole percent methane in hydrogen at 900° C. The partial pressure of ammonia can be higher than that of methane, but it is generally preferred that less than 10 mole percent be used. Hydrogen serves to help dissipate the chlorine present and to carry off excess carbon and nitrogen. It should be present in a reasonable amount, say at least 10 mole percent. Argon is a suitable inert carrier.

After the atmosphere over the intermediate product is converted to argon, the temperature is raised to about 1,200° C. to produce a product containing less than 1 percent chlorine. Preferably, the product is held 1 to 2 hours at 1,200° C. to produce a product with less than 0.1 percent Cl.

The titanium carbonitride product of this process has a surface area greater than 10 $m.^2/g.$, usually greater than 20 $m.^2/g.$ The chlorine content is less than 1 percent, preferably less than 0.1 percent. The chemically bound nitrogen content may range from 1 to 21 weight percent and the chemically bound carbon content may range from 1 to 21 weight percent.

Fine grain titanium carbonitride is useful in the production of dense refractory bodies. The very high surface area product of this invention sinters at considerably lower temperatures than commercial or conventional powders.

EXAMPLE 1

Eighty parts of titanium tetrachloride are distilled into a dry, nitrogen-purged glass flask. The flask is placed in an ice bath and monomethylamine is slowly added until the heat evolution effectively ceases. At this point, approximately 78 parts of monomethylamine will have reacted with the titanium tetrachloride. The solid reaction product is then transferred to a molybdenum boat, which is placed in a tube furnace. The tube furnace is previously purged free of air and moisture with dry nitrogen. The reaction mixture is protected from air and moisture during the transfer.

Monomethylamine is now fed to the furnace at the rate of 1.5 parts per minute. The nitrogen purge is discontinued, and the reaction mixture is heated to 600° C. over a period of 3 hours, maintaining the flow of monomethylamine at 1.5 parts per minute. Hydrogen, at the rate of 0.2 part per minute, is now substituted for the monomethylamine, and the product is heated to 900° C. and held at that temperature for 1½ hours. Then argon is substituted for the hydrogen, and the product is heated at 1,200° C. for 2 hours, in the atmosphere of argon. The product is then cooled to room temperature, and 14 parts of product are recovered. The product is identified by X-ray diffraction analysis as titanium carbonitride, found to contain 20.3 percent carbon, 14.5 percent nitrogen, 0.05 percent chloride, and 64.9 percent titanium. The product has a surface area, by nitrogen adsorption, of 220 $m.^2/g.$

EXAMPLE 2

The procedure of example 1 is repeated, except that an anhydrous mixture containing 18 percent monomethylamine, 22 percent dimethylamine, and 60 percent trimethylamine by weight is substituted for the pure monomethylamine. The resulting product is essentially the same as in example 1.

I claim:

1. A process for the preparation of finely divided titanium carbonitride which comprises (a) reacting in an inert atmosphere titanium tetrachloride and a stoichiometric excess of monomethylamine, dimethylamine, trimethylamine or mixtures thereof at a temperature less than the boiling point of titanium tetrachloride, said reaction being completed upon cessation of the exothermic heat of reaction, (b) heating the reaction product to about 600° C. in an atmosphere of ammonia or said methylamines, (c) increasing the temperature to about 900° C. in an atmosphere of hydrogen or a mixture of hydrogen with at least one member of the group consisting of argon, methane, and ammonia, and (d) increasing the temperature to about 1,200° C. in an atmosphere essentially of argon.

2. A process as in claim 1 where the temperature of the initial reaction (a) is maintained at about 0° to 100° C.

3. A process as in claim 1 where (a) the titanium tetrachloride is reacted with monomethylamine, (b) the temperature is increased to 600° C. in an atmosphere of monomethylamine, (c) the temperature is increased to 900° C. in an atmosphere of hydrogen and (d) the temperature is increased to 1,200° C. in an atmosphere essentially of argon.